(12) United States Patent
Krishnan et al.

(10) Patent No.: US 9,699,527 B2
(45) Date of Patent: Jul. 4, 2017

(54) SYSTEM AND METHOD FOR PROCESSING TELEMATICS DATA

(71) Applicant: Caterpillar Inc., Peoria, IL (US)

(72) Inventors: Kalaiselvan Krishnan, Chennai (IN); Sriram Somasuntharam, Chennai (IN)

(73) Assignee: Caterpillar Inc., Peoria, IL (US)

( * ) Notice: Subject to any disclaimer, the term of this patent is extended or adjusted under 35 U.S.C. 154(b) by 114 days.

(21) Appl. No.: 14/722,208

(22) Filed: May 27, 2015

(65) Prior Publication Data

US 2016/0353185 A1    Dec. 1, 2016

(51) Int. Cl.
*G08C 19/16* (2006.01)
*H04Q 9/00* (2006.01)

(52) U.S. Cl.
CPC ..................... *H04Q 9/00* (2013.01)

(58) Field of Classification Search
CPC . G07C 5/008; G07C 2205/02; H04M 1/6091; H04Q 9/00
USPC ............. 340/870.01, 870.03, 870.05–870.06
See application file for complete search history.

(56) References Cited

U.S. PATENT DOCUMENTS

| 7,401,233 | B2* | 7/2008 | Duri ................... G06F 21/6245 370/337 |
| 8,065,342 | B1 | 11/2011 | Borg et al. |
| 8,928,495 | B2 | 1/2015 | Hassib et al. |
| 2007/0173993 | A1 | 7/2007 | Nielsen et al. |
| 2013/0096799 | A1 | 4/2013 | Horne |
| 2013/0338855 | A1 | 12/2013 | Mason et al. |
| 2014/0114696 | A1* | 4/2014 | Amigo ................... G07C 5/008 705/4 |
| 2014/0288823 | A1 | 9/2014 | Wilson et al. |
| 2015/0187016 | A1* | 7/2015 | Adams ................... G06Q 40/08 705/4 |

* cited by examiner

*Primary Examiner* — Qutbuddin Ghulamali (57) ABSTRACT

A method of processing telematics data associated with multiple machines. The method includes receiving the telematics data from multiple telematics data providers in communication with the machines. The method also includes determining if the telematics data from each of the telematics data providers is in a non-standard format and transforming the telematics data in the non-standard format to a standard format. The method further includes displaying, via a Graphical User Interface (GUI), the telematics data in the standard format.

16 Claims, 9 Drawing Sheets

SYSTEM AND METHOD FOR PROCESSING TELEMATICS DATA

TECHNICAL FIELD

The present disclosure generally relates to a system and method for processing telematics data. More particularly, the present disclosure relates to a system and method for processing telematics data from different telematics data providers.

BACKGROUND

Typically, a working environment such as a worksite or a mine site includes multiple machines associated with different telematics data providers. Further, the machines may be associated with different equipment manufacturing companies. As such, each of the telematics providers may have a different procedure for accessing and retrieving the data and the data format may also vary. For example, telematics data for the machines may be provided at different types of feeds corresponding to different formats such as, AEMP standard, non-AEMP standard and the like. Conventionally, the telematics data for the machines associated with a particular company may be accessed through an application or other sources specific to that company. Moreover, to view the telematics data for all the machines, a user may need to access each of the sources of the telematics data. Therefore, it may be difficult to access the telematics data for the machines associated with different companies and in different formats.

For reference, U. S. Patent publication No. 2013/0338855 is related to a system for presenting fleet vehicle operation information in standardized forms. The system includes a telematics module and a data standardizing module. The telematics module receives measurements related to operation of multiple vehicles in a fleet. The data standardizing module, using a first technique, estimates a first value for a parameter for at least one vehicle of the multiple vehicles based at least on the measurements. Further, the data standardizing module, using a second technique, estimates a second value for the parameter for at least one vehicle of the multiple vehicles based at least on the measurements. The second technique including using some measurement to estimate the second value different from the measurements used to estimate the first value according to the first technique. The data standardizing module outputs one or both of the first value and the second value for presentation to a user.

SUMMARY OF THE DISCLOSURE

One aspect of the present disclosure relates to a method of processing telematics data associated with a plurality of machines. The method includes receiving the telematics data from a plurality of telematics data providers in communication with the plurality of machines. The method also includes determining if the telematics data from each of the plurality of telematics data providers is in a non-standard format and transforming the telematics data in the non-standard format to a standard format. The method further includes displaying, via a Graphical User Interface (GUI), the telematics data in the standard format.

Another aspect of the present disclosure relates to a system for processing telematics data associated with a plurality machines. The system includes a Graphical User Interface (GUI) configured to receive a user input. The system also includes a processing device in communication with the GUI. The processing device is configured to receive telematics data from a plurality of telematics data providers in communication with the plurality of machines. The processing device is also configured to determine if the telematics data is in a non-standard format and transform the telematics data in the non-standard format to a standard format. The processing device is further configured to display, via the GUI, the telematics data in the standard format for the plurality of machines.

Another aspect of the present disclosure relates to a computer program product embodied on a non-transitory computer readable medium for processing telematics data associated with a plurality of machines. The computer program product causes a computer to perform operations. The operations include receiving telematics data from a plurality of telematics data providers in communication with the plurality of machines. The operations also include determining if the telematics data is in a non-standard format and transforming the telematics data in the non-standard format to a standard format. The operation further includes displaying, via a Graphical User Interface (GUI), the telematics data in the standard format for the plurality of machines.

Other features and aspects of this disclosure will be apparent from the following description and the accompanying drawings.

DETAILED DESCRIPTION

Figure 1:
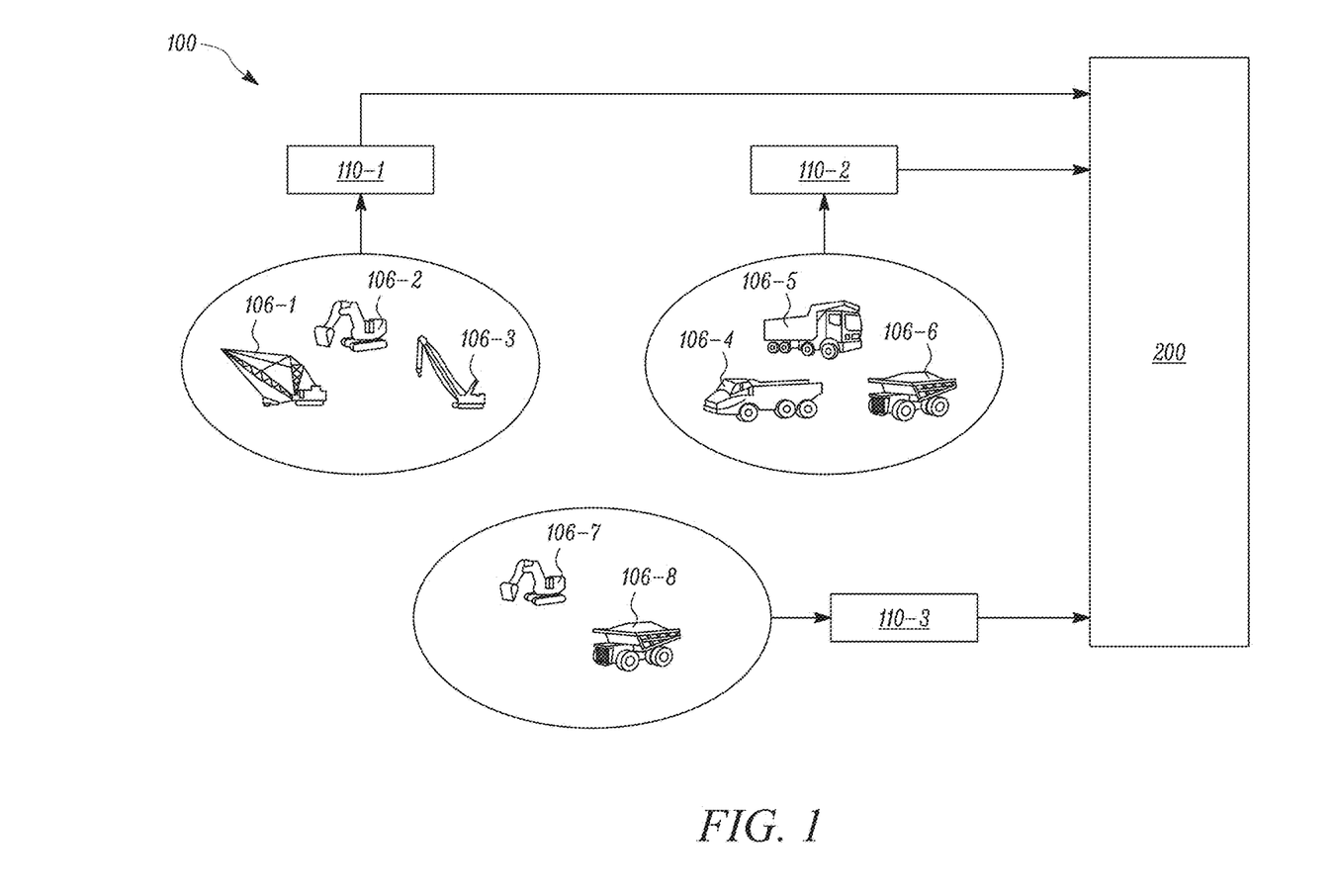
FIG. 1 is an exemplary worksite having multiple machines in communication with a number of telematics data providers, according to an embodiment of the present disclosure.

Wherever possible, the same reference numbers will be used throughout the drawings to refer to same or like parts. FIG. 1 illustrates an exemplary environment 100 implementing a system 200, according to an embodiment of the present disclosure. The environment 100 may include a worksite or a mine site and the like. In an example, the environment 100 may be a construction worksite.

In the illustrated embodiment, the environment 100 includes multiple machines 106-1, 106-2, 106-3, 106-4, 106-5, 106-6, 106-7, 106-8 . . . 106-n, (also collectively referred to as "the machines 106"). The machines 106 may be deployed on the worksite and configured for performing one or more operations such as, transportation of material from one location to another. The machines 106 may be for example, a mining truck, a haul truck, an on-highway truck, an off-highway truck, an articulated truck, and the like. Further, the machines 106 may also embody a number of different loading machines. The loading machine is configured to load the material onto other machines on the worksite. The type of loading machines may include, for example, a conveyor, a large wheel loader, a track-type loader, a shovel, a dragline, a crane or any other loading machine known to one skilled in the art. The machines 106 deployed on the worksite may include manned machines, autonomous machines or semi-autonomous machines.

A number of telematics data providers 110-1, 110-2, 110-3 . . . 110-n, (also collectively referred to as "the telematics data providers 110") may be in communication with the machines 106. In the illustrated embodiment, the machines 106-1, 106-2, 106-3 are in communication with the telematics data provider 110-1. The machines 106-4, 106-5, 106-7 are in communication with the telematics data provider 110-2. Further, the machines 106-8, 106-9 are in communication with the telematics data provider 110-3.

The telematics data providers 110 may be configured to monitor and/or read the telematics data associated with the respective machines 106. In an embodiment, each of the telematics data providers 110 may be configured to receive at least some of the telematics data of the corresponding machines 106 over a network (not shown). The network may be, but not limited to, a wide area network (WAN), a local area network (LAN), an Ethernet, an Internet, an Intranet, a cellular network, a satellite network, or any other suitable network for transmitting data between the machines 106 and the telematics data providers 110. In various embodiments, the network may include a combination of two or more of the aforementioned networks and/or other types of networks known in the art. The network may be implemented as a wired network, a wireless network or a combination thereof. Further, data transmission make take place over the network with a network protocol such that the data transmission is in an encrypted format, any other secure format, or in any of a wide variety of known manners.

The telematics data associated with the machines 106 may include, but not limited to, a location, an utilization, a specification and health of the corresponding machine 106. In an example, telematics data may include parameters related to operation of the associated machines 106, for example, speed, heading direction, location of the machine 106, or any other telematic sensory information associated with the machine 106. The telematics data may also include a unique identifier for each of the machines 106.

In the illustrated embodiment, the telematics data from the telematics data providers 110-1, 110-2 may be in non-standard formats. In an example, the non-standard format may be an Association of Equipment Management Professionals (AEMP) standard. In another example, the format may be a non-AEMP data standard. Further, the telematics data from the telematics data provider 110-3 may be in a standard format. Each of the telematics data providers 110 may include an application programming interface (API) for accessing the associated telematics data in the corresponding formats.

In an embodiment, at least one of the telematics data providers 110 may be a web-based application that is configured to provide telematics data of the machines 106 associated with a particular manufacturing company. In an example, the telematics data providers 110 may include a Vision Link application associated with caterpillar, JD Link application associated with John Deere and the like. Moreover, the telematics data from the telematics data providers 110 may be accessed using corresponding authentication information. In another embodiment, at least one of the telematics data providers 110 may be a datacenter or a data warehouse that stores the telematics data of the associated machines 106. In yet another embodiment, at least one of the telematics data provider 110 may be an onboard telematics system associated with the machine 106. In various other embodiments, the telematics data providers 110 may include other data providers such as, but not limited to, a third party data provider, an ERP system and an SAP system.

Figure 2:
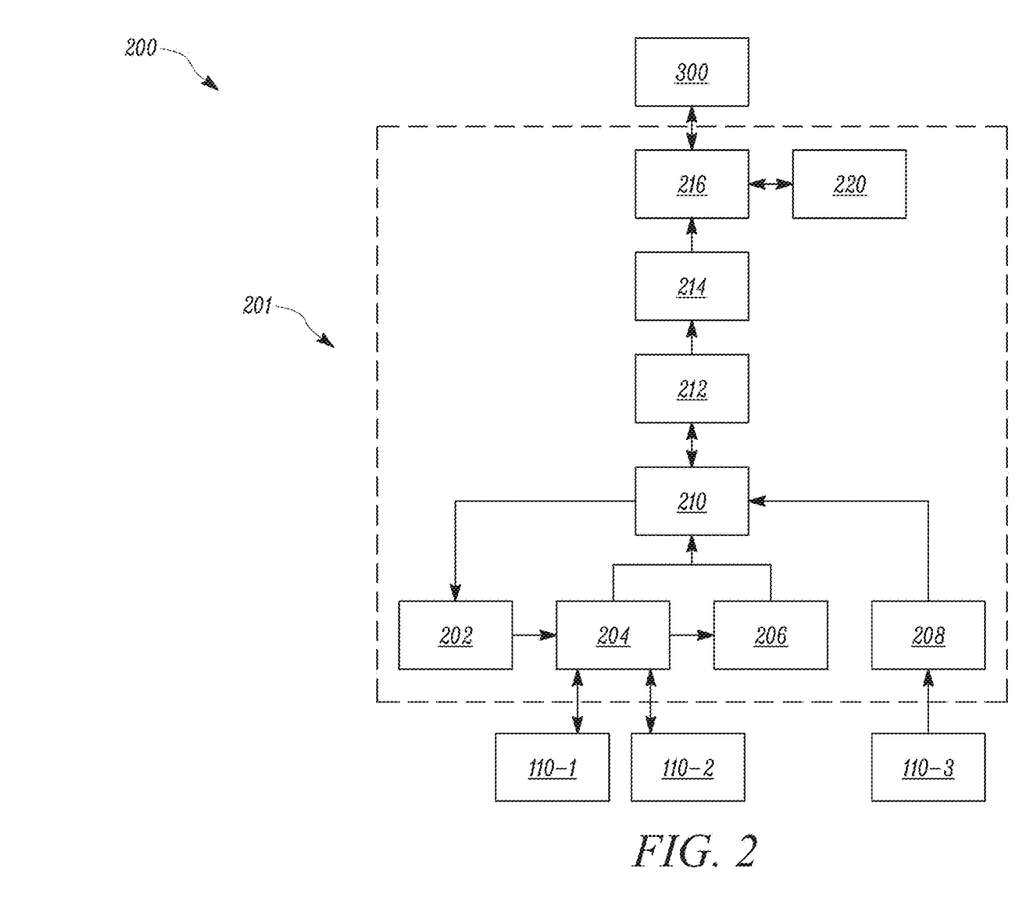
FIG. 2 is a system for processing telematics data associated with the machines, according to an embodiment of the present disclosure.

Referring to FIG. 2, a block diagram for the system 200 configured to process the telematics data from each of the telematics data providers 110 is illustrated. The system 200 includes a processing device 201 and a Graphical User Interface (GUI) 300 in communication with the processing device 201. In an embodiment, the system 200 may be implemented as a web-based application. For example, the system 200 may be a cloud implemented platform hosted in one or more servers accessible to the users over a network e.g., internet. Further, the system 200 may be configured to generate an output e.g., a user interface for display to the user.

The processing device 201 may be any microprocessor based system, for example, a computer or other processors configured to execute the functions that will be described herein. The processing device 201 may be configured with one or more modules for executing respective instructions and providing the output. The GUI 300 may be at least one of a touch based interface, a keyboard based interface, a pointing device (e.g., a mouse) based interface, or a combination thereof. The processing device 201 may receive one or more user inputs via the GUI 300. The processing device 201 may be further configured to execute instructions and provide the output based on the user inputs.

In the illustrated embodiment, the processing device 201 includes a schedule module 202 configured to schedule a request corresponding to downloading the telematics data from the corresponding telematics data providers 110. The schedule module 202 may generate the request for receiving the telematics data from the telematics data providers 110 at predetermined time intervals. In an example, the predetermined time intervals for each of the telematics data providers 110 may be different. Alternatively, the predetermined time intervals may be same for each of the telematics data providers 110. Further, the schedule module 202 may also place each of the requests in a queue based on the corresponding time intervals.

In an embodiment, the schedule module 202 may be operable to generate requests for the telematics data providers 110 having the telematics data in the non-standard formats. In the illustrated embodiment, the telematics data providers 110-1, 110-2 have the telematics data in non-standard formats. Accordingly, the schedule module 202 may generate the request for these telematics data providers 110-1, 110-2 at corresponding predetermined time intervals.

The processing device 201 may include a download module 204 configured to receive the telematics data from at least one of the telematics data providers 110. In the illustrated embodiment, the download module 204 is in communication with the telematics data providers 110-1, 110-2. The download module 204 may also be configured to be in communication with the schedule module 202 to receive the requests indicative of downloading the telematics data at the predetermined time intervals. The download module 204 may also be configured to monitor the requests in the queue. Accordingly, the download module 204 may be configured to invoke the application programming interfaces (API) of the telematics data providers 110 according to the queue and download the corresponding telematics data therefrom. As such, the download module 204 may be configured to receive the telematics data from the telematics data providers 110 at the corresponding predetermined time intervals based on the request. Further, the received telematics data may be stored in a first database 210.

In an embodiment, the download module 204 may be configured to retrieve the authentication information associated with the telematics data providers 110 from the first database 210. The first database 210 may include authentication information for the user to access the telematics data from the telematics data providers 110. The authentication information may include credentials required to invoke the API's of the telematics data providers 110. The processing device 201 may be configured to lookup in the first database 210 and retrieve data therefrom. The first database 210 may also be configured to receive data from the processing device 201 and store the received data. In one embodiment, the first database 210 may be an in-built memory that is integral with the processing device 201. In another embodiment, the first database 210 may be external to the processing device 201.

The processing device 201 may also include a transform module 206 in communication with the download module 204. The download module 204 may be configured to pass a request indicative of transforming the telematics data to the transform module 206. The transform module 206 may be configured to receive the telematics data in the non-standard format from the first database 210. The transform module 206 may be configured to identify if the telematics data from the first database 210 is in any of the non-standard formats.

In an embodiment, the transform module 206 may include multiple adaptors (not shown) configured for processing the telematics data in different non-standard formats. In an example, the transform module 206 may be configured to determine if the telematics data is in the AEMP standard, a non-AEMP standard or any other non-standard formats. Accordingly, the transform module 206 may invoke the respective adaptors that are configured to transform the telematics data in a particular non-standard format to the standard format. Further, the transformed telematics data may be stored in the first database 210.

In an embodiment, the system 200 may include a first application programming interface (API) 208. The first API 208 may be configured to be in communication with the telematics data providers 110 that have the telematics data in the standard format. Further, the first API 208 may be configured to retrieve and/or accept the telematics data in the standard format. Further, the telematics data in the standard format may be stored in the first database 210.

In the illustrated embodiment, the telematics data provider 110-3 has the telematics data in the standard format. Accordingly, the first API 208 may be in communication with the telematics data provider 110-3. In such a case, the API of the telematics data provider 110-3 may include a service gateway (not shown). The service gateway may be associated with a processor that is configured to transform the corresponding telematics data to the standard format. Further, the service gateway may push the telematics data in the standard format to the processing device 201 of the system 200. The first API 208 of the processing device 201 may be configured to retrieve and/or accept the telematics data in the standard format from the service gateway. Moreover, the telematics data providers 110 configured with such service gateways may push the telematics data in the standard format in real-time. Further, the received telematics data in the standard format may be stored in the first database 210.

In various other embodiments, the processing device 201 may include one or more of the first API's 208 to accept the telematics data from multiple telematics data providers 110 that have the telematics data in the standard format.

The processing device 201 may further include a second API 212 in communication with the first database 210. The second API 212 may be configured to access the first database 210 and transfer the telematics data for publishing on the GUI 300. In an embodiment, the processing device 201 may also include an aggregator module 214 configured to receive the telematics data from the second API 212 and aggregate the telematics data associated with the machines in a second database 216.

In an embodiment, each of the first API 208 and the second API 212 may be accessed or invoked using security credentials such as, a username, a password and/or a certificate. Moreover, the GUI 300 may allow the user to input the user credentials so as to access the first API 208 and/or the second API 212. Accordingly, the processing device 201 may authenticate a particular user via the credentials associated with the particular user.

Although, the processing device 201 is described and illustrated to include the first database 210 and the second database 216, it is to be understood that the processing device 201 may include any number of databases or a single database configured to store various data.

In an embodiment, one of the machines 106 may be in communication with at least two telematics data providers 110. In such a case, the processing device 201 may be configured to determine that the telematics data from the at least two telematics data providers 110 is from the one machine 106 is based on the unique identifier for the machine 106. In one embodiment, the processing device 201 may also be configured to process the telematics data from one of the telematics data provider 110 based on a predetermined prioritization associated with each of the telematics data providers 110. Additionally or optionally, the processing device 201 may be configured to process the telematics data from one of the telematics data provider 110 based on a predetermined prioritization associated with each of the telematics data provider with respect to the parameter of the telematics data that is received from the at least two telematics data providers 110.

In an example, the processing device 201 may receive the telematics data for the machine 106-3 from both the telematics data providers 110-1 and 110-3. Specifically, the processing device 201 may receive the parameter of the telematics data for example, a utilization parameter of the machine 106-3 from both the telematics data providers 110-1 and 110-3. In such a case, the telematics data received from the telematics data provider 110-3 may be processed further for display via the GUI 300 if the telematics data provider 110-3 has a higher level of prioritization than the telematics data provider 110-1. Additionally or optionally, the processing device 201 may process the utilization parameter from one of the telematics data providers 110-1, 110-3 that has a higher level of prioritization with respect to the utilization parameter.

In one embodiment, the prioritization of the data may be performed before the aggregator module 214 processes the telematics data. In another embodiment, the prioritization of the data may be performed after the aggregator module 214 processes the telematics data.

Accordingly, the telematics data may be stored in the second database 216. Further, the processing device 201 may be configured to provide an output to the GUI 300 from the second database 216. The telematics data may be displayed in various views based on one or more user inputs received via the GUI 300. Accordingly, the processing device 201 may include one or more modules configured to process the user inputs and correspondingly provide the telematics data to the second database 216 based on the user inputs for subsequent display to the user via the GUI 300.

In the illustrated embodiment, the processing device 201 may include a summarizer module 220. The summarizer module 220 may be configured to receive a selection of a set of parameters related to the telematics data via the GUI 300. Accordingly, the summarizer module 220 may be configured to provide the data related to the selected set of parameters to the second database 216 for subsequent display to the user.

In an embodiment, the parameters may include data related to the total parameters of the corresponding machines 106. The total parameters may include, a total run time for the machine 106, a total distance traveled by the machine 106, a total fuel utilized by the machine 106 and the like. The summarizer module 220 may be configured to determine a value of the total parameter for a predefined time period based on the receive telematics data. In an example, the predefined time period may be one day. The summarizer module 220 may be configured to monitor a performance of the machines 106 at real-time for the day and determine the values for the total parameters per day.

In an example, the summarizer module 220 may be configured to determine a run time for the machine per day by monitoring the total run time values for the machine 106 throughout the day. Similarly, the summarizer module 220 may also be configured to determine the distance traveled per day based on the total distance traveled, and fuel consumed per day based on the total fuel consumed values. Further, the values may be transmitted to the second database 216 for display to the user upon receiving the corresponding user input via the GUI 300.

In an embodiment, the processing device 201 may also include a geo-fence module (not shown) in communication with the second database 216. The geo-fence module may be configured to process telematics data for the machines 106 operating in locations indicated within a geographical fence input by the user. Moreover, various alerts and/or notifications may also be generated for the user related to the corresponding machines 106.

Although, the processing device 201 is described and illustrated to include multiple modules such as, the schedule module 202, the download module 204, the transform module 206 and the like, it is to be understood that functions of or more of these module may be executed by a single module of the processing device 201.

Referring to FIGS. 3 to 7, the GUI 300 of the system 200 displaying the telematics data in various views is illustrated. The GUI 300 may include multiple graphical control elements that may allow the user to provide inputs related to various functions such as, but not limited to, a selection of one or more features, creation of one or more files, views and the like. The processing device 201 may be configured to receive the user inputs via one or more of these graphical control elements and accordingly perform tasks or execute the instructions. Further, the processing device 201 may also be configured to provide, via the GUI 300, the output i.e., the telematics data for display to the user. As described above, the telematics data from the telematics data providers 110 may include a location of the corresponding machine 106, utilization of the corresponding machine 106, specification of the corresponding machine 106 and health of the corresponding machine 106.

Figure 3:
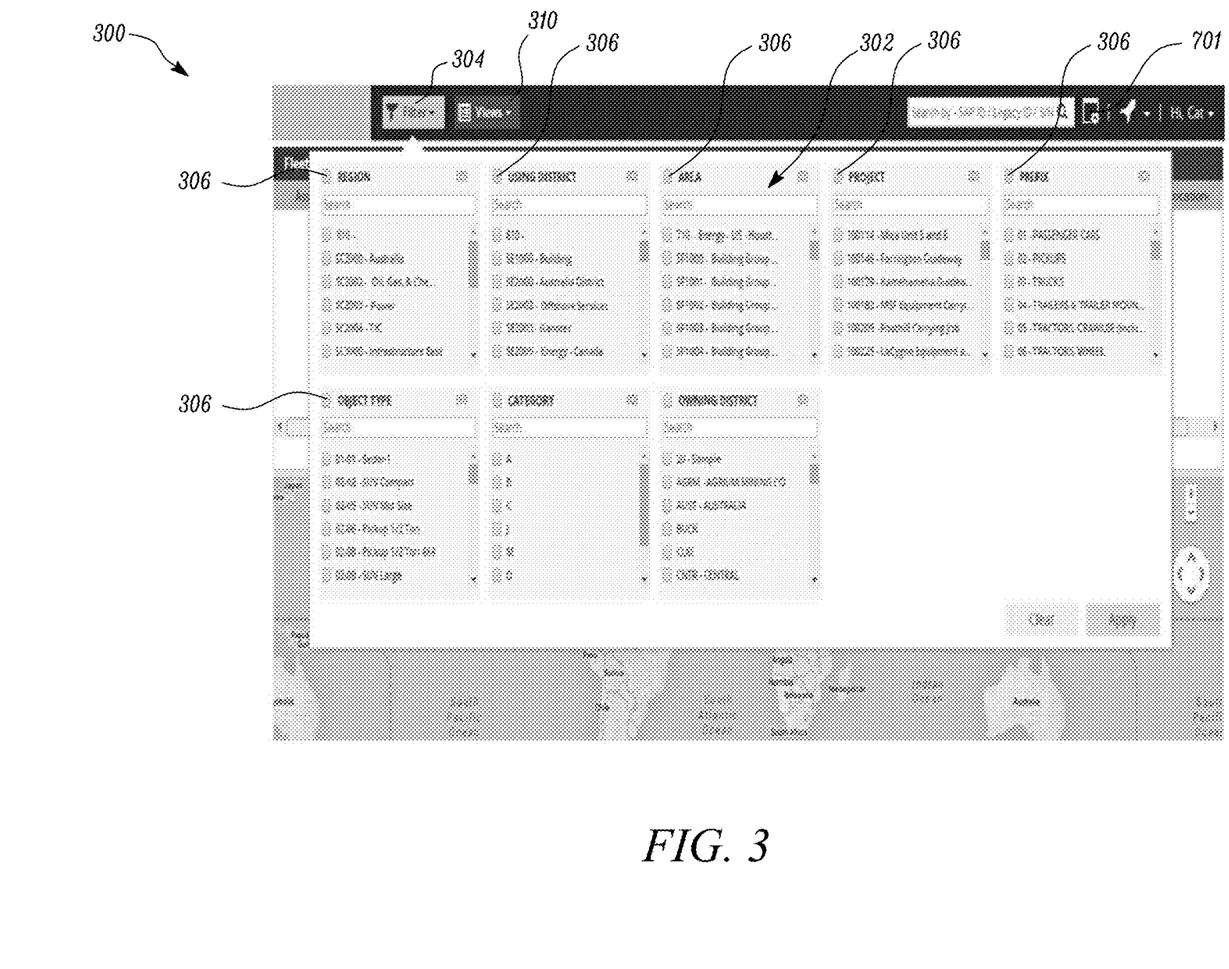
FIG. 3 is a GUI of the system displaying a process tab for a selecting a set of parameters related to the telematics data, according to an embodiment of the present disclosure.

Referring to FIG. 3, the GUI 300 may include a control element 304 configured to allow the user to provide input corresponding to selection of a set of parameters from multiple parameters of the telematics data in the standard format. The parameters of the telematics data may include location related parameters such as, region, district, area; a type of machine and the like. Further, each of the parameters may include multiple items that may be optionally selected. The processing device 201 may receive the input via the control element 304 and may display or navigate to a process tab 302 of the GUI 300. The process tab 302 may be, for example, a window, a dialogue box, a page, etc. The process tab 302 may include the parameters of the telematics data.

As shown, the process tab 302 may include a control element 306 associated with each of the parameters and configured to allow the corresponding parameter to be selected. Moreover, each parameter may include a list of items of the parameters. For example, a region parameter may include a list of regions. Each of the items may also be associated with a control element configured to allow the corresponding item to be selected. Moreover, the GUI 300 may allow a user to conditionally select one or more parameters and also one or more items from the list of items and parameters.

The processing device 201 may be configured to receive the user input indicative of the selection of the set of parameters and/or the items corresponding to the parameters via the GUI 300. The processing device 201 may be configured to display the data related to the selected parameters via the GUI 300.

In an embodiment, the selection of parameters may include selecting the set of machines 106 from the machines 106. Accordingly, the control element 304 may be configured to allow the user to provide an input indicative of a selection of a set of machines 106 from the machines 106. Further, the processing device 201 may be configured to receive the user input and display the telematics data in the standard format for the selected set of machines 106.

Figure 4:
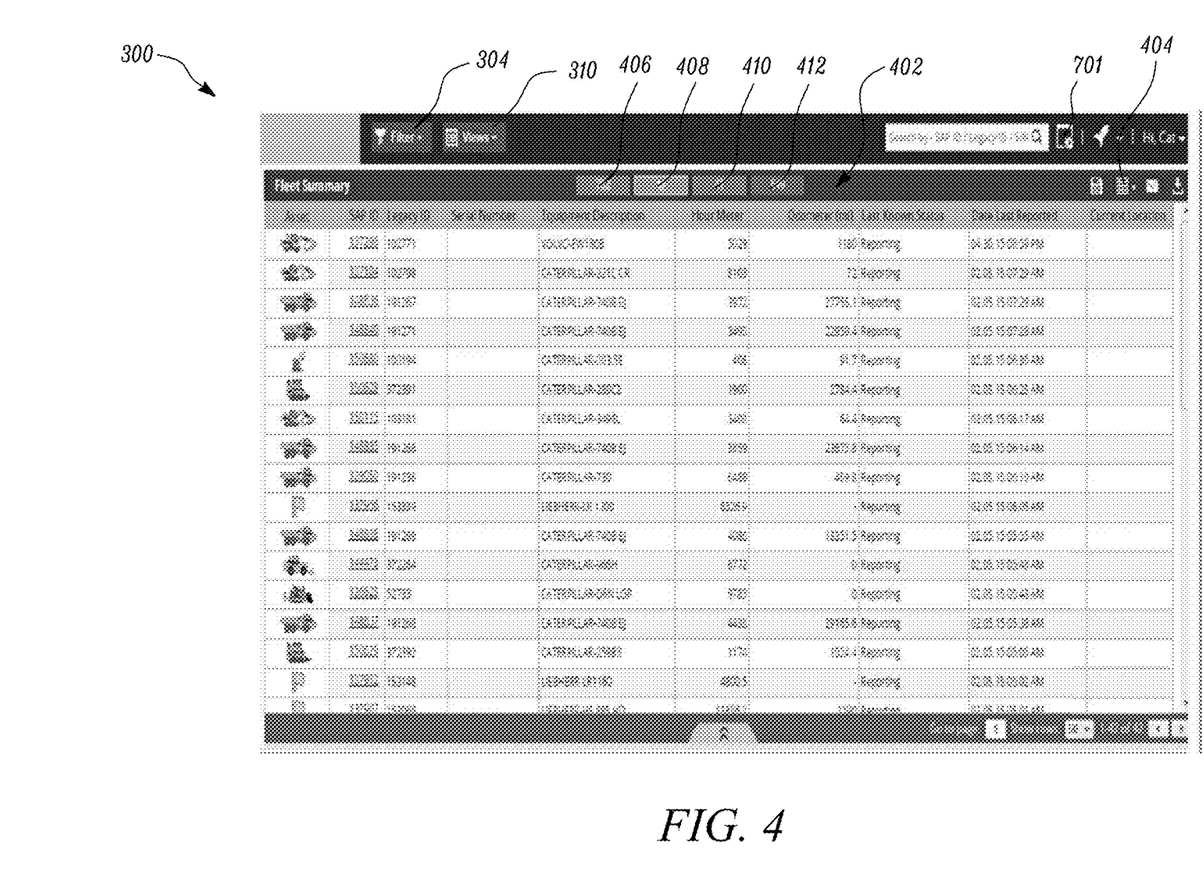
FIG. 4 is a GUI of the system displaying a process tab for the data related to the set of parameters, according to an embodiment of the present disclosure.

Referring to FIG. 4, a process tab 402 showing a summary data associated with the machines 106 is illustrated. In an embodiment, the summary data may be displayed based on the set of parameters selected via, the control element 304 and other control elements of the process tab 302. In another embodiment, the summary data may be displayed based on a default set of parameters. Moreover, the summary data for the machines 106 may include columns that may be, identifiers for the machine 106 such as, a serial number, legacy ID, SAP ID, project name, project number; a description or a specification of the machine 106 such as, make, model, model year, type of machine 106; a location information such as, area name, area number, owning district, region, using district, current location; a status of the machine 106 such as, a last date reported, reporting, stopped reporting, never reported; readings from an hourmeter, an odometer and the like. The GUI 300 may include a control element 404 that may allow a user to select a set of columns to be displayed from the multiple columns.

The GUI 300 may also allow a user to provide input corresponding to viewing a set of the machines 106 based on a reporting status. As shown, the GUI 300 may include a control element 406 that may allow the user to provide the input corresponding to displaying the telematics data of all the machines 106. Further, the GUI 300 may also include control elements 408, 410, 412 that may allow the user to provide the input to display the data related to machines 106 that are reporting, the machines 106 that have stopped reporting and the machines 106 or that have never reported respectively.

Further, the GUI 300 may include a control element 310 that allows a user to provide input corresponding to saving a view for different selections such as, a selection of a set of parameters related to the machines 106. As such, the processing device 201 may save the view and accordingly retrieve the selections of parameters when the particular view is selected. For example, the views may include a process tab (not shown) showing telematics data such as, utilization, the summary data and the like.

In an embodiment, the telematics data may include data related to total parameters of the corresponding machine 106. The total parameters may include, total run time for the machine 106, total distance traveled, total fuel utilized and the like. As discussed above, the summarizer module 220 may be configured to determine a value for the total parameter for a predefined time period based on the received telematics data. In an example, the predefined time period may be one day.

Figure 5:
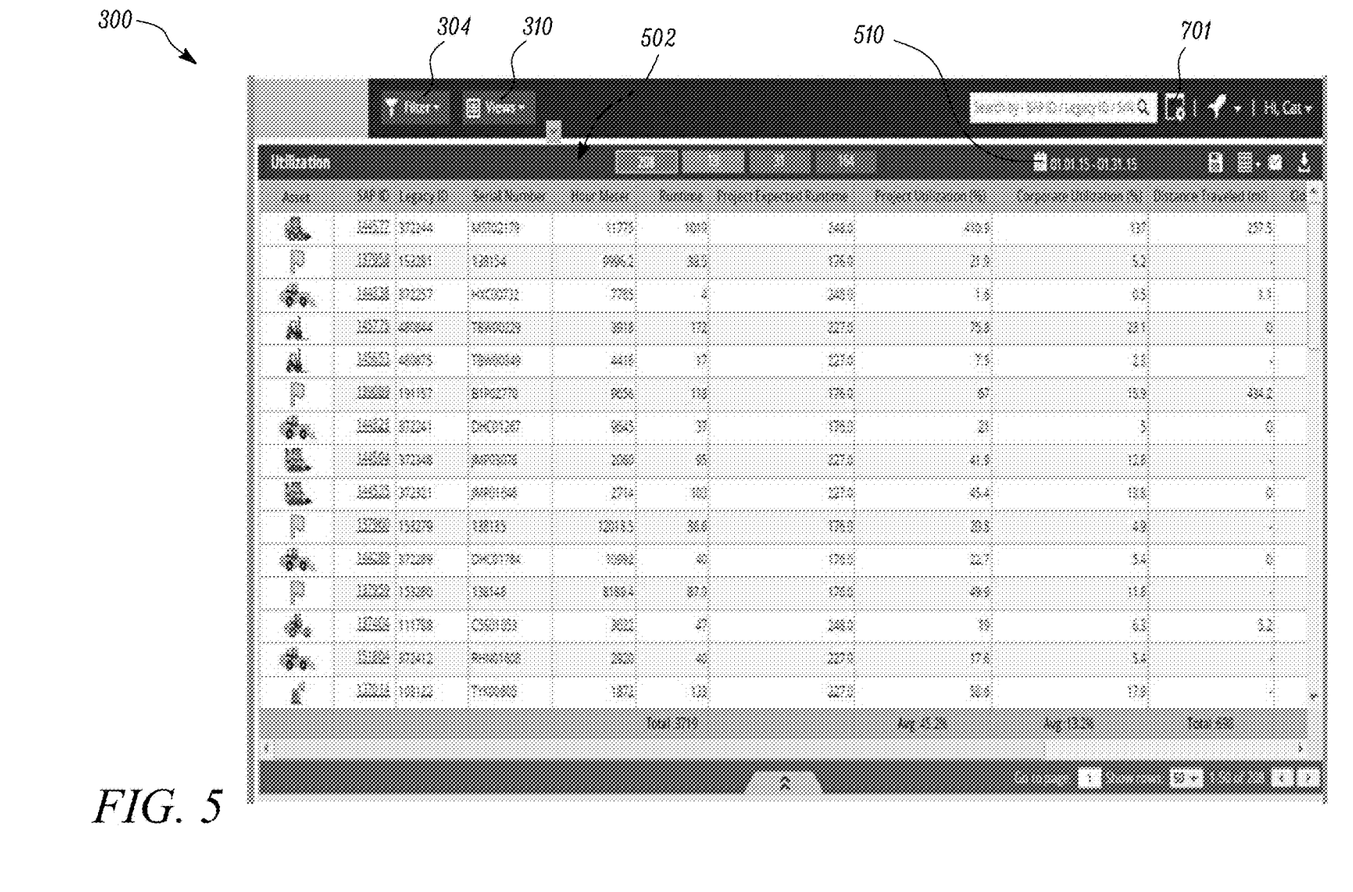
FIG. 5 is a GUI of the system displaying a process tab for utilization data associated with the machines, according to an embodiment of the present disclosure.

Referring to FIG. 5, a process tab 502 showing the exemplary utilization data for the machines 106 is illustrated. Moreover, the process tab 502 may include a control element 510 that may allow a user to select the predefined time period. The processing device 201 may receive the user input via the control elements 310, 510 and accordingly display the data related to the values of the total parameters. In an embodiment, the control element 310 may allow a user to provide input corresponding to viewing the utilization data related to the values of the total parameters for the predefined time period.

The GUI 300 may also allow a user to provide input corresponding to viewing the telematics data related to a particular machine 106 of the multiple machines 106. In an embodiment, at least one of the identifiers associated with the machines 106 may include a hyperlink. For example, the process tab 402 and/or 502 may include SAP ID's corresponding to the machines 106 and configured with the hyperlinks. As such, the user may provide the input by clicking on the hyperlink of the particular machine 106. The processing device 201 may be configured to receive the user input and display the telematics data for the corresponding machine 106.

Figure 6:
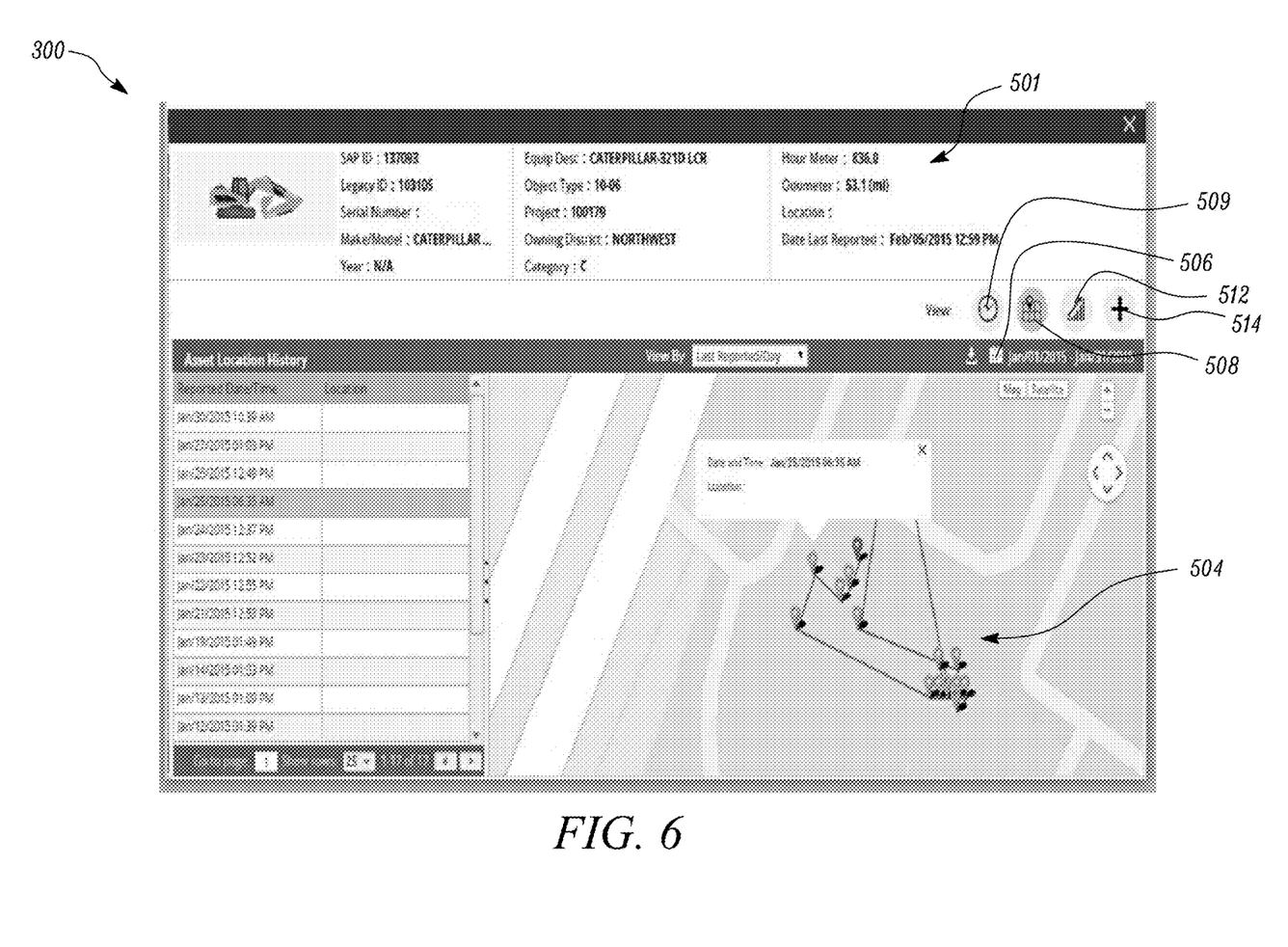
FIG. 6 is a GUI of the system displaying a process tab for a location history of an exemplary machine, according to an embodiment of the present disclosure.

Referring to FIG. 6, the processing device 201 may be configured to display a process tab 501 upon receiving the user input indicative of displaying the telematics data for the corresponding machine 106. The process tab 501 may include control element 508 configured to allow the user to provide an input to display a location history for the corresponding machine 106. The processing device 201 may be configured to determine the location history of the corresponding machine 106 based on the received telematics data. The processing device 201 may be further configured to display the locations of the corresponding machine 106 on a map 504 based on the location history. In an embodiment, the processing device 201 may also display the location of the corresponding machine 106 along with the reporting time. Moreover, the location history may be determined for a time period that may be set via a control element 506.

Further, the process tab 501 may also include control elements 509, 512 and 514. The control element 509 may allow the user to provide input corresponding to viewing data related to an event history for the particular machine. The control element 512 may allow the user to provide input corresponding to viewing data related to the utilization data of the particular machine 106.

The control element 512 may allow the user to provide input corresponding to viewing data related to health of the particular machine 106. In an embodiment, the processing device 201 may also be configured to determine a health of the machine 106 based on an occurrence of a fault code for the corresponding machine 106. Further, the processing device 201 may display a severity of the fault code and number of occurrences for each of the fault codes.

Figure 7:
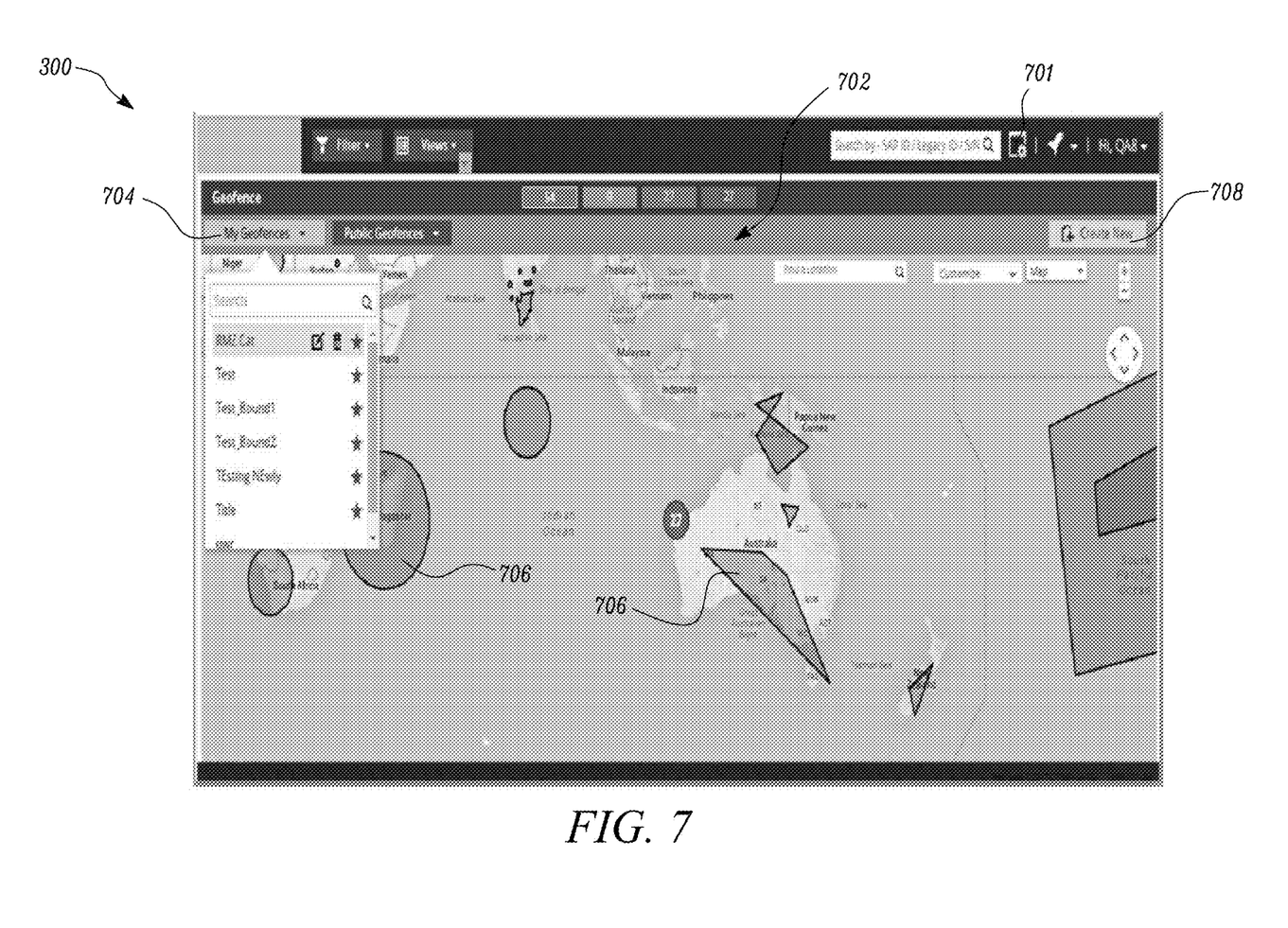
FIG. 7 is a GUI of the system displaying a process tab for an exemplary geographical fence of the machines, according to an embodiment of the present disclosure.

The GUI 300 may include a control element 701 that may allow a user to provide input related to geographical fence. Referring to FIG. 7, a process tab 702 displaying exemplary geographical fence 706 is illustrated. The process tab 702 may include a control element 708 that allows a user to create the geographical fence 706. Further, the geographical fence 706 may be stored and accessed via a control element 704.

In an embodiment, the GUI 300 may also allow a user to set alerts for the machines 106 based on various parameters related to the telematics data. In an example, the alerts may be set based on geographical fence 706, a status of the machine 106 or other parameters. The processing device 201 may be configured to receive the user input and accordingly determine if an alert condition is met. Further, the processing device 201 may display a notification on the GUI 300 based on the alert. Further, the views showing telematics data such as, utilization, health, summary, geographical fence and the like may be saved and accordingly retrieve the selections of parameters when the particular view is selected. As described above, the control element 310 may allow a user to provide input corresponding to a selection of a particular view.

A person of ordinary skill in the art will acknowledge that the GUI 300 and the corresponding graphical control elements explained above are merely exemplary in nature and hence non-limiting of this disclosure. Moreover, necessary design and/or functional modifications may be possible for the GUI 300 without deviating from the scope of the present disclosure.

Further, the environment 100 described above is to be considered as merely exemplary in nature and hence non-limiting of this disclosure. Moreover, the environment 100 may include any number and/or configurations of machines 106 in communication with any number and/or configurations of the telematics data providers 110.

In fact, in accordance with an embodiment of the present disclosure, the present disclosure is directed towards one or more computer systems capable of carrying out the functionality described herein. An example of the computer based system includes a computer based system 600, which is shown by way of a block diagram in FIG. 8.

Figure 8:
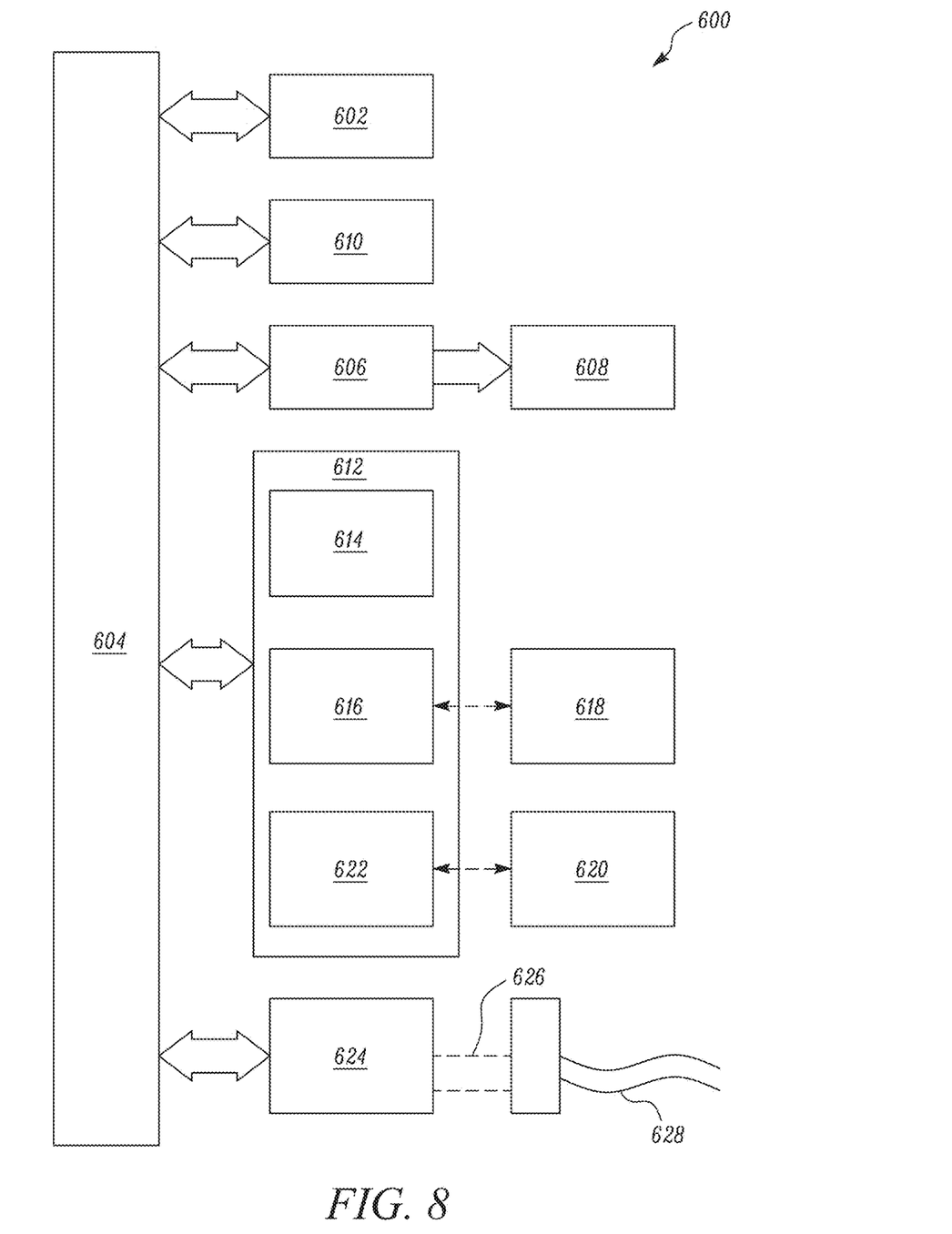
FIG. 8 is a block diagram of an exemplary computer based system, according to an embodiment of the present disclosure.

The computer based system 600 includes at least one processor, such as a processor 602. The processor 602 may be connected to a communication infrastructure 604, for example, a communications bus, a cross-over bar, a network, and the like. Various software embodiments are described in terms of this exemplary computer based system 600. Upon perusal of the present description, it will become apparent to a person skilled in the relevant art(s) how to implement the present disclosure using other computer systems and/or architectures.

The computer based system 600 includes a display interface 606 that forwards graphics, text, and other data from the communication infrastructure 604, or from a frame buffer (not shown) for display on a display unit 608.

The computer based system 600 further includes a main memory 610, such as random access memory (RAM), and may also include a secondary memory 612. The secondary memory 412 may further include, for example, a hard disk drive 614 or a removable storage drive 616, representing a floppy disk drive, a magnetic tape drive, an optical disk drive, etc. The removable storage drive 616 reads from and/or writes to a removable storage unit 618 in a well known manner. The removable storage unit 618 may represent a floppy disk, magnetic tape or an optical disk, and may be read by and written to by the removable storage drive 616. As will be appreciated, the removable storage unit 618 includes a computer usable storage medium having stored therein, computer software and/or data.

In accordance with various embodiments of the present disclosure, the secondary memory 612 may include other similar devices for allowing computer programs or other instructions to be loaded into the computer based system 600. Such devices may include, for example, a removable storage unit 620, and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit 620 to the computer based system 600.

The computer based system 600 may further include a communication interface 624. The communication interface 624 allows software and data to be transferred between the computer based system 600 and external devices. Examples of the communication interface 624 include, but may not be limited to a modem, a network interface (such as an Ethernet card), a communications port, a Personal Computer Memory Card International Association (PCMCIA) slot and card, and the like. Software and data transferred via the communication interface 624 may be in the form of a number of signals, hereinafter referred to as signals 626, which may be electronic, electromagnetic, optical or other signals capable of being received by the communication interface 624. The signals 626 may be provided to the communication interface 624 via a communication path (e.g., channel) 628. The communication path 628 carries the signals 626 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 616, a hard disk installed in the hard disk drive 614, the signals 626, and the like. These computer program products provide software to the computer based system 600. The present disclosure is directed to such computer program products.

Computer programs (also referred to as computer control logic) may be stored in the main memory 610 and/or the secondary memory 612. The computer programs may also be received via the communication interface 604. Such computer programs, when executed, enable the computer based system 600 to perform the functions consistent with the present disclosure, as discussed herein. In particular, the computer programs, when executed, enable the processor 602 to perform the features of the present disclosure. Accordingly, such computer programs represent controllers of the computer based system 600.

In accordance with an embodiment of the present disclosure, where the disclosure is implemented using a software, the software may be stored in a computer program product and loaded into the computer based system 600 using the removable storage drive 616, the hard disk drive 614 or the communication interface 624. The control logic (software), when executed by the processor 602, causes the processor 602 to perform the functions of the present disclosure as described herein.

In another embodiment, the present disclosure is implemented primarily in hardware using, for example, hardware components, such as, application specific integrated circuits (ASIC) Implementation of the hardware state machine so as to perform the functions described herein will be apparent to persons skilled in the relevant art(s). In yet another embodiment, the present disclosure is implemented using a combination of both the hardware and the software.

Various embodiments disclosed herein are to be taken in the illustrative and explanatory sense, and should in no way be construed as limiting of the present disclosure. All numerical terms, such as, but not limited to, "first" and "second" or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 9:
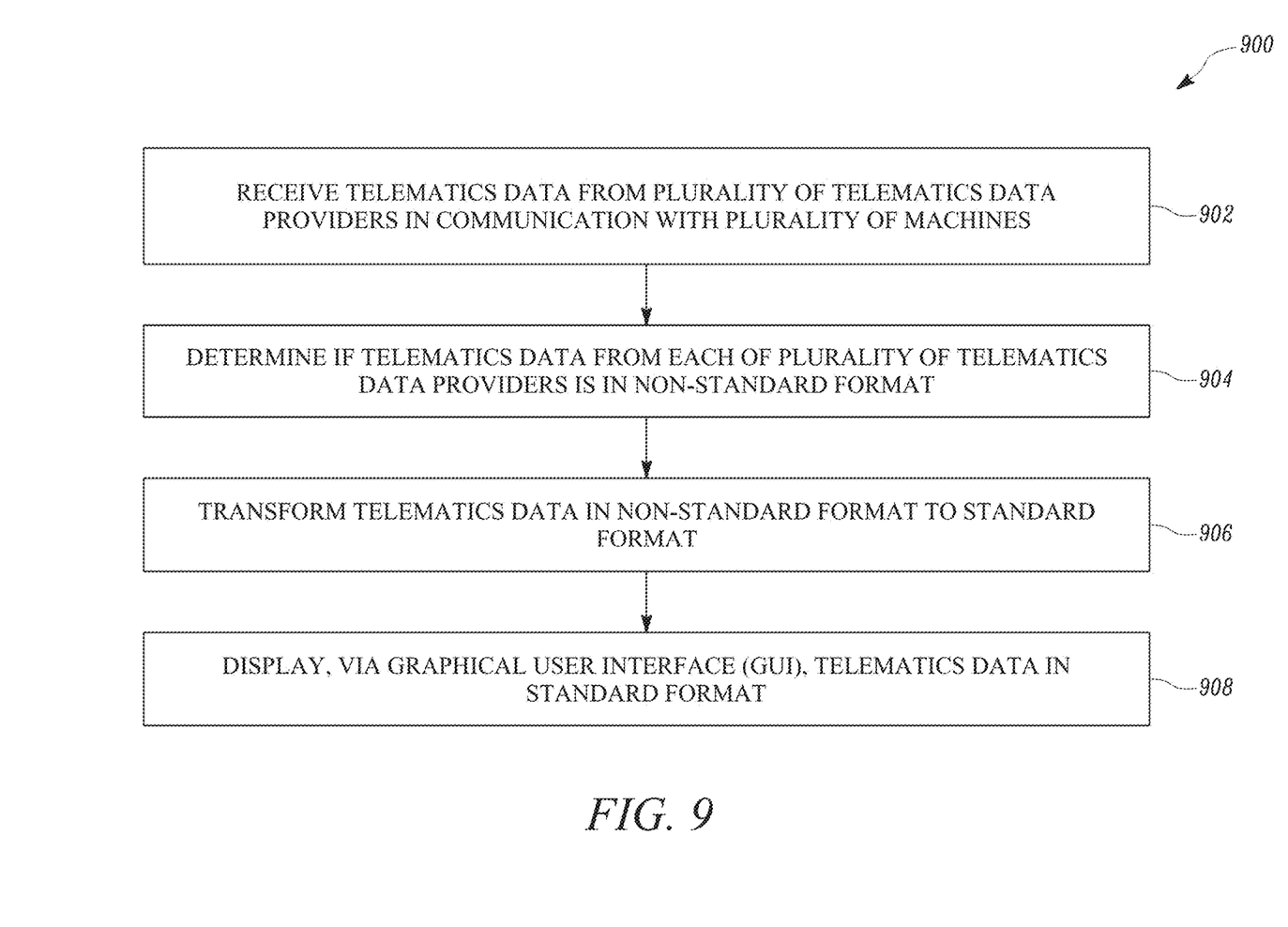
FIG. 9 is a flowchart of a method for determining a cost of a casting process, according to an embodiment of the present disclosure.

FIG. 9 illustrates a flowchart of a method 900 for processing the telematics data associated with multiple machines, for example, the machines 106, according to an embodiment of the preset disclosure. In an embodiment, one or more steps of the method 900 may be implemented using the system 200 described above.

At step 902, the method 900 includes receiving the telematics data from the telematics data providers 110 in communication with the machines 106. The telematics data providers 110 may include different applications of manufacturing companies, third party telematics data providers, on-board telematics systems and the like. The telematics data providers 110 may receive at least a part of the telematics data associated with the corresponding machines 106. In an embodiment, the telematics data at each of the telematics data providers 110 may be in different non-standard formats and/or the standard format. In an example, the non-standard formats may include AEMP standard, non-AEMP standard and the like.

At step 902, the method 900 may further include generating a request for receiving the telematics data from at least one of the telematics data providers 110 at the predetermined time intervals. Specifically, the requests for receiving the telematics data may be generated for the telematics data providers 110 having the telematics data in the non-standard formats. Moreover, based on the predetermined time intervals for each of the telematics data providers 110, the request may be placed in a queue. Further, the requests in the queue may be monitored and the API's of the corresponding telematics data providers 110 may be invoked to subsequently download the telematics data at the predetermined time intervals. In an embodiment, the method 900 may also include retrieving the authentication information for accessing the telematics data from the corresponding telematics data providers 110.

At step 904, the method 900 includes determining if the telematics data from each of the telematics data providers 110 is in the non-standard format. The processing device 201 may be configured to determine if the telematics data from the telematics data providers 110 corresponds to any of the non-standard formats. Accordingly, based on the determined non-standard format, respective adaptors may be invoked for each of the telematics data providers 110. At step 906, the method 900 includes transforming the telematics data in the non-standard format to the standard format. The adaptors may be configured to transform the telematics data in the corresponding non-standard format to the standard format.

In another embodiment, the telematics data at least one of the telematics data providers 110 may be in the standard format. In such a case, the method 900 may include accepting the telematics data from the corresponding telematics data providers 110. The first API 208 of the processing device 201 may be configured to accept the telematics data in the standard format from the corresponding telematics data providers 110.

The telematics data in the standard format received from each of the telematics data providers 110 may be stored in the first database 210. In an embodiment, the telematics data from the telematics data providers 110 includes a unique identifier associated with the corresponding machine 106.

In an embodiment, one of the machines 106 may be in communication with at least two telematics data providers 110. In such a case, the method 900 may include determining that the telematics data from the at least two telematics data providers 110 is from the one machine 106 is based on the unique identifier for the machine 106. Moreover, the method 900 may also include processing the telematics data from one of the telematics data provider 110 based on a predetermined prioritization associated with each of the telematics data providers 110. In an example, the telematics data for the machine 106-3 may be received from both the telematics data providers 110-1 and 110-3. In such a case, the telematics data received from the telematics data provider 110-3 may be processed further for display via the GUI 300 if the telematics data provider 110-3 has a higher level of prioritization than the telematics data provider 110-1.

At step 908, the method 900 includes displaying, via the GUI 300, the telematics data in the standard format. The telematics data from the telematics data provider 110 may include a location of the corresponding machines 106, the utilization of the corresponding machines 106, a specification of the corresponding machines 106, a health of the corresponding machines 106 and the like.

In an embodiment, the telematics data from the telematics data providers 110 may include data related to the parameters of the corresponding machines 106. The method 900 may also include selecting a set of parameters from the parameters of the telematics data and displaying, via the GUI 300, the data related to the selected parameters. In one example, the method 900 includes receiving, via the GUI 300, a user input indicative of the set of parameters. In another example, the method 900 may include automatically displaying the data related to the set of parameters that are set as default.

In an embodiment, the selection of the set of parameters may include selecting a set of machines 106 from the machines 106. For example, the set of machines 106 may be selected based on the specification of the machines 106 such as, a make, a model, identifiers or other descriptions related to the machines 106. Accordingly, the processing device 201 may be configured to receive the selection of the set of machines 106 and accordingly display the telematics data in the standard format for the selected set of machines 106.

In another embodiment, the method 900 may include determining the location history for the machines 106 based on the received telematics data. The method 900 may include receiving, via the GUI 300, a user input to determine the location history for one or more machines 106. Further, the locations of the corresponding machines 106 may be displayed, via the GUI 300, on the map 504 based on the location history. Additionally or optionally, the location history for each of the machines 106 may be determined and stored in the second database 216. In such a case, the location history for the corresponding machine 106 may be displayed based on the user input received, via the GUI 300.

The telematics data may also include data related to the total parameters of the machines 106. The total parameters may include total run time of the machine 106, total fuel utilized, total distance traveled and the like. In an embodiment, the method 900 may also include determining a value for the total parameter for a predefined time period based on the received telematics data and displaying these values, via the GUI 300. In an example, the values for the total parameters may be determined for a day. In another example, the values for the total parameters may be determined for an hour.

The system 200 and the method 900 of the present disclosure have applicability for use and implementation in processing the telematics data associated with the machines 106. The telematics data from different telematics data providers 110 that have the telematics data in different formats may be processed. Moreover, the telematics data that is in the non-standard format may be transformed to the standard format. Such an implementation provides a unified presentation of the telematics data from different telematics data providers 110 and hosted on a single platform. Moreover, the system 200 may be implemented as a web-application to enable the users to view the telematics data via the GUI 300 of the system 200.

Additionally, with use of the system 200 and the method 900, the output may be generated according to various scenarios, views and types of parameters. The GUI 300 of the system 200 allows a user to input various selections of different parameters such as, location, specification, utilization and the like. Accordingly, the data related to these parameters may be displayed, via the GUI 300 based on the user input.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of processing telematics data associated with a plurality of machines, the method comprising:
   receiving the telematics data from a plurality of telematics data providers in communication with the plurality of machines;
   determining if the telematics data from each of the plurality of telematics data providers is in a non-standard format;
   transforming the telematics data in the non-standard format to a standard format;
   displaying, via a Graphical User Interface (GUI), the telematics data in the standard format, wherein the telematics data comprises data related to total parameters of the corresponding machine;
   determining a value of the total parameter for a predefined time period based on the received telematics data; and
   displaying, via the GUI, the value of the total parameter for the predefined time period.

2. The method of claim 1 further comprising:
   generating a request for receiving the telematics data from at least one telematics data provider of the plurality of telematics data providers at predetermined time intervals;
   receiving the telematics data at the predetermined time intervals based on the request.

3. The method of claim 2, wherein one machine of the plurality of machines is in communication with at least two telematics data providers, wherein the method further comprises determining that the telematics data from the at least two telematics data providers is from the one machine based on the unique identifier.

4. The method of claim 1, wherein the telematics data from the telematics data provider comprises a unique identifier associated with a corresponding machine of the plurality of machines.

5. The method of claim 1, wherein the telematics data from the plurality of telematics data providers comprises data related to a plurality of parameters of a corresponding machine of the plurality of machines, wherein the method further comprising:
   selecting a set of parameters from the plurality of parameters of the telematics data in the standard format; and
   displaying, via the GUI, the data related to the selected parameters.

6. The method of claim 5 further comprising receiving, via the GUI, a user input indicative of the set of parameters from the plurality of parameters.

7. The method of claim 1 further comprising:
   receiving, via the GUI, a user input indicative of a selection of a set of machines from the plurality of machines;
   displaying, via the GUI, the telematics data in the standard format for the selected set of machines.

8. The method of claim 1, wherein the telematics data from the telematics data provider comprises location of a corresponding machine of the plurality of machines, wherein the method further comprises:
   determining a location history of the corresponding machine based on the received telematics data; and
   displaying, via the GUI, locations of the corresponding machines on a map based on the location history.

9. The method of claim 1, wherein the telematics data from the telematics data provider comprises location of a corresponding machine of the plurality of machines, utilization of the corresponding machine, specification of the corresponding machine and health of the corresponding machine.

10. A system for processing telematics data associated with a plurality machines, the system comprising:
    a Graphical User Interface (GUI) configured to receive a user input; and
    a processing device in communication with the GUI, the processing device configured to:
      receive telematics data from a plurality of telematics data providers in communication with the plurality of machines;
      determine if the telematics data is in a non-standard format;
      transform the telematics data in the non-standard format to a standard format; and
      display, via the GUI, the telematics data in the standard format for the plurality of machines,
      wherein the telematics data from the telematics data provider comprises a unique identifier associated with a corresponding machine of the plurality of machines,
      wherein one machine of the plurality of machines is in communication with at least two telematics data providers, wherein the processing device is further configured to determine that the telematics data from the at least two telematics data providers is from the one machine based on the unique identifier.

11. The system of claim 10, wherein the processing device is further configured to:
    generate a request for receiving the telematics data from at least one telematics data provider of the plurality of telematics data providers at predetermined time intervals;
    receive the telematics data at the predetermined time intervals based on the request.

12. The system of claim 10, wherein the telematics data from the plurality of telematics data providers comprises data related to a plurality of parameters of a corresponding machine of the plurality of machines, wherein the processing device is further configured to:
    select a set of parameters from the plurality of parameters of the telematics data in the standard format; and
    display, via the GUI, the data related to the selected parameters.

13. The system of claim 12, wherein the processing device is further configured to receive, via the GUI, a user input indicative of the set of parameters from the plurality of parameters.

14. The system of claim 10, wherein the telematics data from the telematics data provider comprises location of a corresponding machine of the plurality of machines, wherein the processing device is further configured to:
    determine a location history of the corresponding machine based on the received telematics data; and
    display, via the GUI, locations of the corresponding machines on a map based on the location history.

15. The system of claim 10, wherein the telematics data from the telematics data provider comprises location of a corresponding machine of the plurality of machines, utilization of the corresponding machine, specification of the corresponding machine and health of the corresponding machine.

16. A system for processing telematics data associated with a plurality machines, the system comprising:

a Graphical User Interface (GUI) configured to receive a user input; and a processing device in communication with the GUI, the processing device configured to:

receive telematics data from a plurality of telematics data providers in communication with the plurality of machines;

determine if the telematics data is in a non-standard format;

transform the telematics data in the non-standard format to a standard format; and display, via the GUI, the telematics data in the standard format for the plurality of machines, wherein the telematics data comprises data related to total parameters of the corresponding machine, wherein the processing device is further configured to:

determine a value of the total parameter for a predefined time period based on the received telematics data; and display, via the GUI, the value of the total parameter for the predefined time period.

\* \* \* \* \*